Dec. 28, 1965 K. H. WIESE 3,225,890
ARTICLE ALIGNING APPARATUS
Filed Nov. 29, 1963 2 Sheets-Sheet 1

INVENTOR.
KLAUS H. WIESE
BY

Dec. 28, 1965     K. H. WIESE     3,225,890
ARTICLE ALIGNING APPARATUS

Filed Nov. 29, 1963     2 Sheets-Sheet 2

INVENTOR.
KLAUS H. WIESE
BY James E. Conroy

_United States Patent Office_  3,225,890
Patented Dec. 28, 1965

3,225,890
ARTICLE ALIGNING APPARATUS
Klaus H. Wiese, Rialto, Calif., assignor to Kaiser Steel Corporation, Oakland, Calif., a corporation of Nevada
Filed Nov. 29, 1963, Ser. No. 326,923
7 Claims. (Cl. 198—29)

The present invention relates generally to apparatus for effecting automatic transverse shifting of articles being transported on conveyors, and more particularly to a device for automatically sensing the sizes of articles of various sizes and causing such as are offset to shift into alignment with the axis of a conveyor upon which they are being transported. The invention is applicable to any suitable type of conveying device, such as chain conveyors, roller tables, endless belts, cars and carriages, and the term "conveyor" used herein is to be so construed.

A specific application of the invention selected for illustration and description herein is the centering of sheet metal strip coils on chain conveyors where coils of different diameters and widths are encountered. Coils leaving a down-coiler are usually placed on a chain conveyor passing through a turntable before they enter the main run of the conveyor. A crane may be employed at times to set the coils on the conveyor. Under certain conditions a coil may get under way while not being properly centered on the conveyor and as it travels, the initial amount of offset may increase until it drops off the conveyor with attendant damage.

An automatic centering device according to the present invention is preferably located at the beginning of the main run of the conveyor to effect automatic shifting of offset coils transversely of the conveyor into alignment with the central axis of the conveyor. The device first measures the diameter of a particular coil passing therethrough and automatically spacer elements uniformly from the center plane of the conveyor a distance apart slightly greater than the measured coil diameter so that if the axis of the coil is offset from the center plane, the coil will engage the element on the offset side to cause the coil to slide across the conveyor into alignment with the axis thereof.

The centering device according to the present invention uses independent gauging means for sensing the transverse dimension of an article being conveyed, and automatically adjusts the spacing between elements in the path of the article to substantially that dimension so that an article which is offset with respect to said elements will engage the one on the offset side to move itself transversely of the conveyor into a position centrally of the elements. If the elements are equally spaced from the center plane of the conveyor, the article will thereby be shifted into alignment with the longitudinal axis thereof.

The centering device of this invention is of rugged and relatively simple construction, provides automatic positive positioning action for articles of various sizes, and may be installed in connection with existing conveyor systems.

Other features and advantages of the present invention will be readily apparent to those skilled in the art from the following specification and the appended drawing in which.

Figure 1:
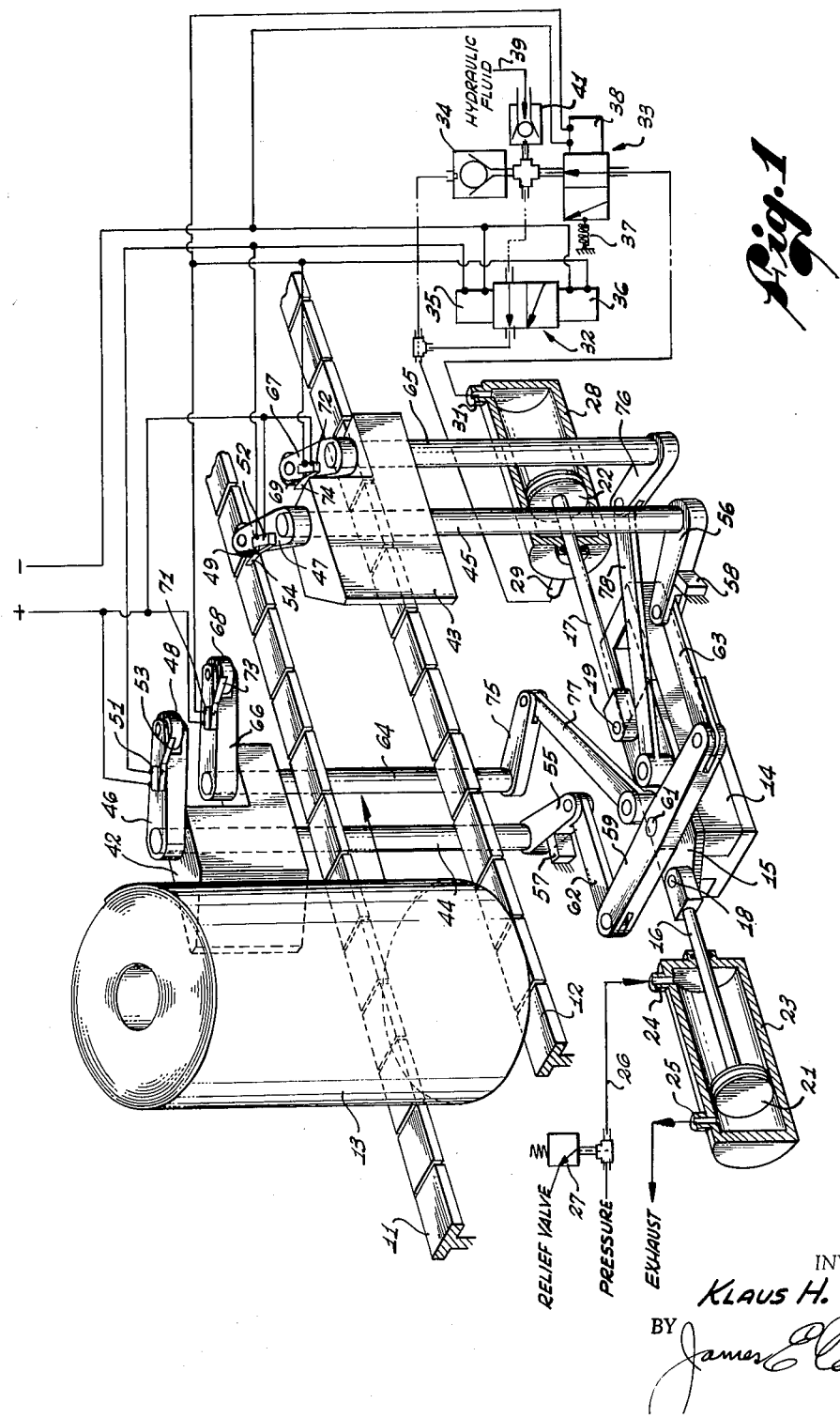
FIGURE 1 is a schematic, perspective representation of a centering device according to the present invention.
Figure 2:
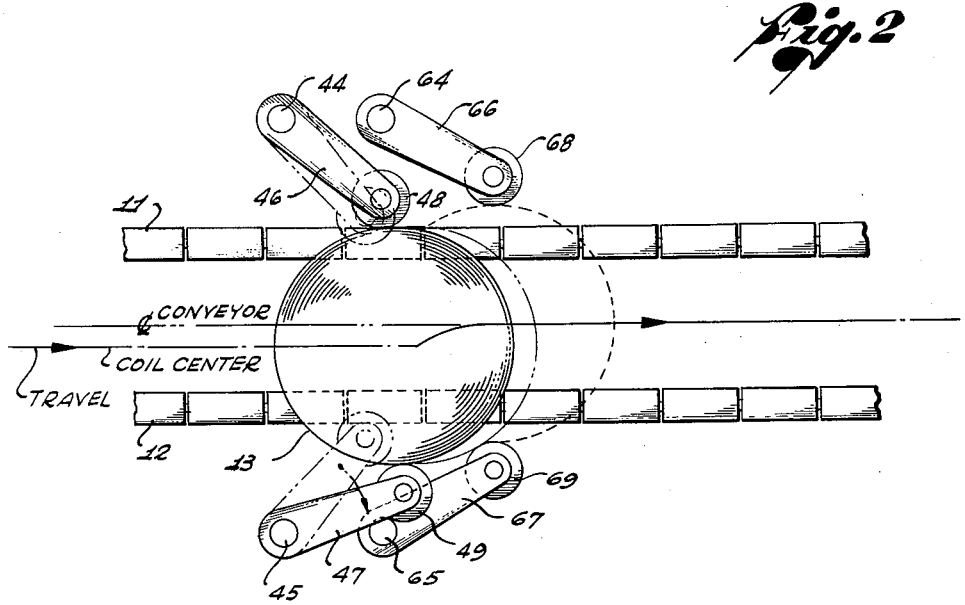
FIGURE 2 is a schematic, plan view illustrating the sizing and shifting operation of the centering device of the present invention.

Referring to the drawing, a conveying device is schematically represented by the spaced, parallel, chain-conveyor elements 11 and 12 supporting on their top surfaces a coil 13 of strip sheet metal mounted on end thereon. Centrally disposed beneath the conveyor elements 11 and 12 is a stationary support 14 mounting and guiding a slide 15 for movement in opposite directions parallel to the longitudinal axis of the conveyor. To the opposite ends of the slide 15 are pivotally secured piston rods 16 and 17 as by pivots 18 and 19, respectively. The end of rod 16 is connected to a slide biasing and moving piston 21 and rod 17 is connected to a slide locking piston 22.

Piston 21 is mounted in an operating cylinder 23 having an inlet 24 and an outlet 25 to exhaust. Air under pressure is conducted to the inlet 24 from a pressure line 26 which may have a relief valve 27 therein to limit the pressure in the line 26 and the cylinder 23.

Piston 22 is mounted in a cylinder 28 having ports 29 and 31 at its opposite ends connecting the cylinder in a hydraulic fluid system including solenoid valves 32 and 33 and a check valve 34. The solenoid valve 32 is moved to open position by a solenoid 35 and to closed position by a solenoid 36. The valve 33 is normally biased to open position by a spring 37 and is moved to closed position by a solenoid 38. Fluid within the hydraulic system is maintained from a source, indicated generally at 39, through a check valve 41.

At opposite sides of the conveyor elements 11 and 12 are a pair of stationary supporting blocks 42 and 43 in which are rotatably supported a pair of vertical shafts 44 and 45, respectively. Sizing arms 46 and 47 are rigidly mounted on the upper ends of the shafts 44 and 45, above the supporting blocks 42, 43. Rollers 48 and 49 are mounted for rotation in the free ends of the arms 46 and 47, and are engaged by the coil 13 in the operation of sensing the diameter of the coil. Electric switches 51 and 52 having operating arms 53 and 54 are mounted on the arms 46 and 47, respectively, in positions for engagement of the operating arms 53, 54 by the coil 13 as it moves therebetween. The switches 51 and 52 are of the normally open type and are connected in parallel so that operation of either or both of them performs the same circuit closing function of energizing solenoid 35 to move the valve 32 to closed position.

Arms 55 and 56 are rigidly secured on the lower ends of the shafts 44 and 45, respectively. Stationary stops 57 and 58 limit the extremes of rotation of the arms 55 and 56 and the forward position of slide 15 to the positions shown in FIGURE 1. A transverse lever 59 is pivotally mounted adjacent its mid point to the slide 15 at 61, and links 62 and 63 pivotally connect the ends of the lever 59 with the free ends of the arms 55 and 56. The linkage arrangement is such that the arms 46 and 47 can be rotated to change the spacing between the rollers 48 and 49 only with accompanying rectilinear movement of the slide 15 parallel to the conveyor. On the other hand, once the slide 15 is positioned so that the arms 55 and 56 leave the stops 57 and 58, the arms 46 and 47 may be rotated without change in the spacing therebetween by rotating the lever 59 without moving the slide 15. It is only a change in the spacing between the rollers 48 and 49 transversely of the conveyor which requires movement of the slide 15.

A second pair of vertical shafts 64 and 65 are rotatably mounted in the stationary supporting blocks 42 and 43 and spaced from the shafts 44 and 45 in the direction of conveyor travel. Arms 66 and 67 are rigidly connected to the upper ends of the shafts 64 and 65 and have rollers 68 and 69 mounted for rotation in their free ends. Electric switches 71 and 72 having operating arms 73 and 74 are mounted on the arms 66 and 67 in positions for the switch operating arms to be engaged by the coil 13 prior to its engagement with the rollers 68 and 69 and for maintaining engagement with the switch operating arms until shafting of the coil or other article into the centered position between the rollers 68 and 69 is completed.

Switches 71 and 72 are also of normally open type and are connected in parallel to effect energization of solenoids 36 and 38 to simultaneously open valve 32 and close valve 33.

Arms 75 and 76 are rigidly mounted on the lower ends of the shafts 64 and 65, and links 77 and 78 pivotally connect the free ends of the arms 75 and 76 to the slide 15. In view of the connection of the links 77 and 78 directly to the slide 15, the rollers 68 and 69 will always be equally distant from the vertical plane through the longitudinal axis of the conveyor, and the spacing between the rollers 68 and 69 will be determined by the position of the slide 15 along the conveyor axis.

The operation of the centering device of this invention will now be described. Air pressure being admitted to the line 26 will enter the cylinder 23 and move piston 21 toward the left, as viewed in FIGURES 1 and 3, to move the slide 15 to its extreme forward position opposite the direction of conveyor travel. The piston 22 is free to move with the slide 15 as the hydraulic fluid moves from the left hand portion of the cylinder 28 to the right hand portion through the open valves 32 and 33. All of the rollers 48, 49, 68, 69 will therefore be moved to their minimum spacings from the vertical plane through the axis of the conveyor and will stop with the engagement of the arms 55, 56 with the stops 57, 58.

As a coil 13 is moved by the conveyor elements 11, 12 to a position between the supporting blocks 42, 43, it will, if positioned off center engage a switch operating arm 53 or 54 on the side to which the coil is offset, in the condition illustrated in the drawings the switch operating arm 54. Closure of switch 52 by its operating arm 54 energizes solenoid 35 and closes valve 32 to prevent flow of hydraulic fluid from the left hand end of cylinder 28 to the right hand end thereof. However, a path is still open through the valve 33 and check valve 34 to transfer hydraulic fluid from the right hand end of cylinder 28 to the left hand end thereof so that the piston 22 is free to move with the slide 15 in the direction of conveyor travel only.

As the coil 13 continues to move with the conveyor, it will first engage the roller 49 and shortly thereafter the roller 48 to move the rollers further apart and thereby cause movement of the slide 15 in the direction of conveyor travel. The coil 13 engages switch operating arm 53 without effect since switch 51 parallels switch 52. The movement of the slide 15 and the further separation of rollers 48, 49 is opposed by the constant pressure on piston 21. The maximum separation of the rollers 48 and 49 equals the diameter of the coil 13 and they are held to this separation by the locking of the slide 15 against return movement by the piston 22.

Figure 3:
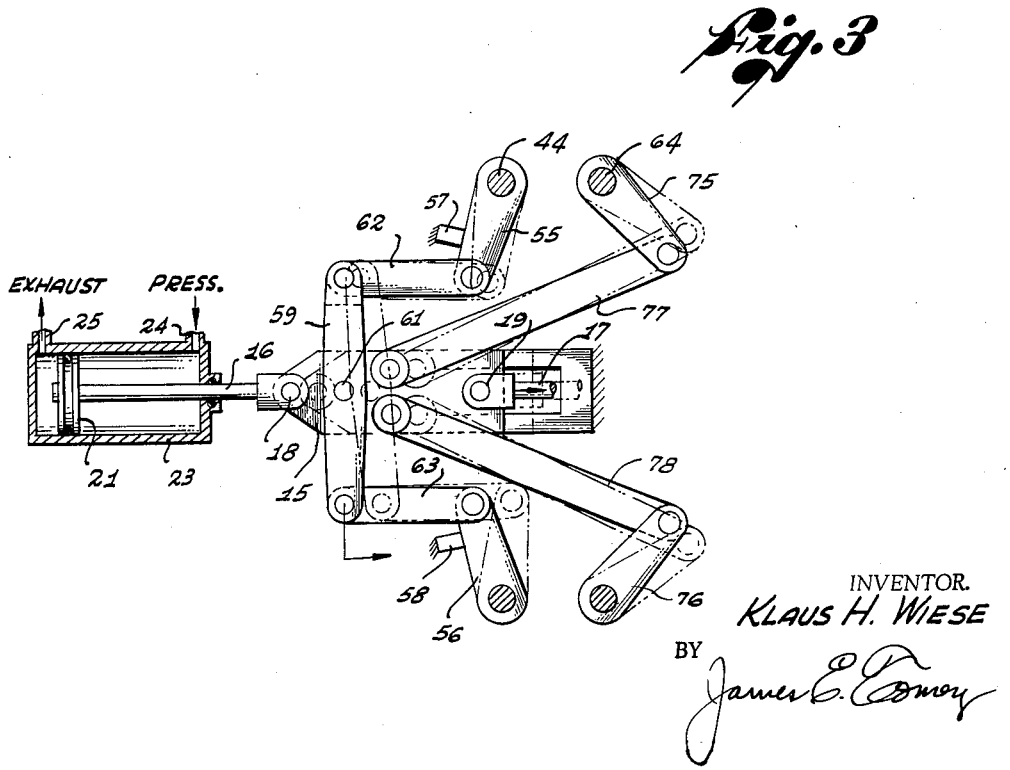
FIGURE 3 is a schematic representation of the linkage connections between the sizing and shifting elements of the device.

The rotation of the arms 46 and 47 by the movement of the coil 13 therebetween moves the slide 15 from the full line position into the dotted line position of FIGURE 3 and the arms 66 and 67 are thereby rotated by the links 77 and 78 so that the rollers 68 and 69 are separated substantially the same or slightly more (if originally so set) than the coil diameter gauged by the rollers 48 and 49. Since the links 77 and 78 are pivoted directly to the slide 15, the rollers 68 and 69 will always be equidistant from the vertical plane through the axis of the conveyor. As the coil 13 leaves the switch operators 53 and 54 no change occurs in the hydraulic circuit to cylinder 28 since the valve 32 remains in its closed position, preventing return movement of piston 22 and slide 15.

Since the links 62 and 63 are pivoted to a pivoted link 59, it is apparent that the arms 46 and 47 can move together with constant spacing therebetween without moving the slide 15, once the stops 57 and 58 are left, and that gauging of the diameter of coil 13 can occur anywhere between the stationary supporting blocks 42, 43, within the limitations of movement of the arms 46 and 47.

As the coil 13 is moved onward by the conveyor, it will first engage whichever of the switch operating arms 73, 74 is located on the side to which it is offset, in the case illustrated the operating arm 74 which closes switch 72 to energize solenoids 38 and 36, simultaneously thereby closing valve 33 and opening valve 32. Closing of valve 33 prevents transfer of fluid between the opposite ends of cylinder 28 to lock piston 22 and slide 15 therewith against movement. The coil shifting rollers 68 and 69 are locked with slide 15 in their positions spaced apart a distance substantially equal to the diameter of the coil 13 which now engages the roller 69 to be forcibly shifted into a position centered between the rollers 68, 69. Since the rollers 68 and 69 are equally spaced from the center plane through the conveyor, this shifting aligns the axis of the coil with the axis of the conveyor.

Contact of the coil with the switch operating arms 73, 74 is maintained until the shifting movement is completed and when the coil thereafter releases the switch operating arms, the switches 71 and 72 are both opened to deenergize the solenoids 36 and 38. Valve 32 remains in its open position and valve 33 is moved to its open position under the bias of spring 37. This releases the piston 22 for return movement by providing a path for transfer of fluid from the left hand to the right hand side of the cylinder 28 through the open valves 32 and 33. The slide 15 is now moved forwardly, opposite to the direction of conveyor travel, by the constant pressure within cylinder 23 acting on piston 21. The slide 15 stops when the arms 55, 56 engage the stops 57, 58 or prior thereto if the rollers 48, 49 engage the next approaching coil. In either case, the device is ready for another size gauging and centering cycle as previously described.

While the device has been specifically illustrated for use in centering sheet metal strip coils on chain conveyors, it is obvious that it may be applied to any articles of varied sizes and shapes and in any desired type of conveyor system. It will further be obvious that while described as shifting an article into alignment with the central axis of the conveyor, the apparatus is readily adaptable to locating the rollers 68 and 69 equally distant from any other desired plane of reference transversely of the conveyor. Other modifications and embodiments of the invention are contemplated within the scope thereof which is to be limited only by the broadest interpretation of the terms of the following claims.

I claim:

1. Apparatus for automatically centering articles of varied sizes being transported on a conveyor comprising: size sensing means mounted on opposite sides of the vertical plane through the axis of the conveyor and movable by the passage of an article therebetween to a separated position wherein the distance therebetween is substantially equal to the dimension of the article transversely of the conveyor, said sensing means being movable to positions spaced differently from said plane so as to sense an article's dimension while it is offset with respect to said plane; article shifting means mounted on opposite sides of said plane and movable to vary the spacing therebetween but always maintained equidistant from said plane; means interconnecting said size sensing means and said shifting means so as to effect automatic separation of said shifting means in response to movement of said size sensing means to effect a separation between said shifting means neither less nor substantially greater than the separation between said size sensing means; means locking said shifting means in adjusted position prior to engagement of a sized article therewith so that the article must shift bodily into alignment with said plane to clear said shifting means; and means for releasing said shifting means after shifting of the article thereby.

2. Apparatus for automatically centering articles of various sizes being transported on a conveyor comprising: a pair of article sizing elements mounted above and on opposite sides of the center plane through the conveyor; means mounting said sizing elements for movements to vary the spacing therebetween; means biasing said elements to a minimum spaced position; a pair of article shifting elements mounted above and on opposite sides of said center plane and interconnected so as to be movable to vary the spacing therebetween but always equidistant from said center plane; means interconnecting said sizing elements and said shifting elements to effect concurrent movement thereof to automatically space the article shifting elements apart substantially the same distance as the distance to which said article sizing elements are moved by the passage of an article therebetween; means locking said shifting elements in their adjusted positions; and means releasing said shifting elements upon passage of the article therebetween.

3. Apparatus for automatically aligning articles of various sizes with a reference plane while the articles are being transported on a conveyor comprising: sizing means located above said conveyor in the path of articles traveling thereon to be engaged by and to sense the transverse dimension of an article on the conveyor; article shifting means mounted above said conveyor in the path of articles thereon and including elements positionable varying distances apart but always equidistant from said reference plane; means interconnecting said sizing means and article shifting elements so as to effect automatic positioning of the elements a distance apart determined by the transverse article dimension sensed by said sizing means; means for locking said elements in adjusted position to force an offset article to shift transversely into alignment with said reference plane; and means for releasing said elements on passage of the article therebetween.

4. Apparatus for automatically centering articles of various sizes being transported on a conveyor comprising: sizing means located above said conveyor in the path of articles traveling thereon to be engaged by and to sense the transverse dimension of an article on the conveyor; means biasing said sizing means toward a position corresponding to minimum article dimension so that the sizing means will be moved by articles passing thereby into sizing position against the biasing force; article shifting means mounted above said conveyor in the path of articles thereon and including elements positionable varying distances apart but always equidistant from the center plane through the conveyor; means interconnecting said sizing means and article shifting elements so as to effect automatic positioning of the elements a distance apart determined by the transverse article dimension sensed by said sizing means; means for locking said elements in adjusted position to force an offset article to shift transversely into alignment with the center plane of the conveyor; and means for releasing said elements on passage of the article therebetween.

5. Apparatus for automatically centering articles of various sizes being transported on a conveyor comprising: a pair of article sizing arms; means mounting said arms above and on opposite sides of said conveyor for rotation about axes at right angles to the plane of the conveyor; means movable rectilinearly parallel to the direction of travel of said conveyor; a lever arm pivotally mounted on said rectilinearly movable means; means interconnecting said lever arm with said sizing arms so that movement of said sizing arms to vary the spacing therebetween must be accompanied by movement of said rectilinearly movable means but movement of said sizing arms without changing the spacing therebetween may be accomplished by rotation of said lever arm; a pair of article shifting arms mounted above and on opposite sides of said conveyor and equally spaced from the center plane of the conveyor; means connecting said shifting arms to said rectilinearly movable means to vary the spacing therebetween; said sizing arms being engageable by an article transported therebetween by the conveyor so as to separate a distance conforming to the transverse dimension of the article and independent of an offset position of the article to move the rectilinearly movable means; movement of the rectilinearly movable means automatically separating the article shifting arms a distance substantially equal to the transverse dimension of the article sensed by the sizing arms; means biasing said rectilinearly movable means toward the position of minimum arm separation; means locking said rectilinearly movable means in the position to which it is adjusted by the passage of an article between said sizing arms; and means for releasing said rectilinearly movable means after shifting of the article by said shifting arms.

6. Apparatus for automatically centering articles of various sizes being transported on a conveyor comprising: a pair of article sizing arms; means mounting said arms above and on opposite sides of said conveyor for rotation about axes at right angles to the plane of the conveyor; means movable rectilinearly parallel to the direction of travel of said conveyor; a lever arm pivotally mounted on said rectilinearly movable means; means interconnecting said lever arm with said sizing arms so that movement of said sizing arms to vary the spacing therebetween must be accompanied by movement of said rectilinearly movable means but movement of said sizing arms without changing the spacing therebetween may be accomplished by rotation of said lever arm; a pair of article shifting arms mounted above and on opposite sides of said conveyor and equally spaced from the center plane of the conveyor; means connecting said shifting arms to said rectilinearly movable means to vary the spacing therebetween; said sizing arms being engageable by an article transported therebetween by the conveyor so as to separate a distance conforming to the transverse dimension of the article and independent of an offset position of the article to move the rectilinearly movable means; movement of the rectilinearly movable means automatically separating the article shifting arms a distance substantially equal to the transverse dimension of the article sensed by the sizing arms; means biasing said rectilinearly movable means toward the position of minimum arm separation; means locking said rectilinearly movable means in the position to which it is adjusted by the passage of an article between said sizing arms; and means for releasing said rectilinearly movable means after shifting of the article by said shifting arms; said locking and releasing means for the rectilinearly movable means including a piston movable in a cylinder and a hydraulic system controlling the flow of hydraulic fluid between the cylinder chambers on opposite sides of the piston.

7. Apparatus for automatically centering articles of various sizes being transported on a conveyor comprising: a pair of article sizing arms; means mounting said arms above and on opposite sides of said conveyor for rotation about axes at right angles to the plane of the conveyor; means movable rectilinearly parallel to the direction of travel of said conveyor; a lever arm pivotally mounted on said rectilinearly movable means; means interconnecting said lever arm with said sizing arms so that movement of said sizing arms to vary the spacing therebetween must be accompanied by movement of said rectilinearly ovable means but movement of said sizing arms without changing the spacing therebetween may be accomplished by rotation of said lever arm; a pair of article shifting arms mounted above and on opposite sides of said conveyor and equally spaced from the center plane of the conveyor; means connecting said shifting arms to said rectilinearly movable means to vary the spacing therebetween; said sizing arms being engageable by an article transported therebetween by the conveyor so as to separate a distance conforming to the transverse dimensions of the article and independent of an offset position of the article to move the rectilinearly movable means; movement of the rectilinearly movable means automatically separating the article shifting arms a distance substantially equal to the transverse dimension of the article sensed by the sizing arms; means biasing said rectilinearly movable means toward the position of minimum arm separation; means locking said rectilinearly movable means in the position to which it is adjusted by the passage of an article between said sizing arms; and means for releasing said rectilinearly movable means after shifting of the article by said shifting arms; the biasing means for said rectilinearly movable means including an air cylinder having a piston connected to the rectilinearly movable means, and means for supplying a substantially constant air pressure to the cylinder.

References Cited by the Examiner

UNITED STATES PATENTS 2,641,371    6/1953    Webster _____ 214—89

FOREIGN PATENTS 1,058,933    6/1959    Germany.

SAMUEL F. COLEMAN, *Primary Examiner.*

WILLIAM B. LABORDE, *Examiner.*